United States Patent [19]
Peebles

[11] 3,858,905
[45] Jan. 7, 1975

[54] DEMOUNTABLE SAFETY LADDER WITH HAND RAIL

[76] Inventor: Delbert W. Peebles, 519 11th Ave. Ext., Nampa, Idaho 83651

[22] Filed: July 19, 1973

[21] Appl. No.: 380,924

[52] U.S. Cl................... 280/163, 280/166, 182/93, 182/106, 182/206
[51] Int. Cl............................................. B60r 3/00
[58] Field of Search ............ 280/163, 166; 182/206, 182/93, 106

[56] References Cited
UNITED STATES PATENTS

| | | | |
|---|---|---|---|
| 2,467,800 | 4/1949 | Backlin et al...................... | 182/106 |
| 3,330,577 | 7/1967 | Mills.................................. | 280/166 |
| 3,512,608 | 5/1970 | Huntley........................... | 182/206 X |
| 3,610,658 | 10/1971 | Sartori............................ | 280/166 X |
| 3,647,023 | 3/1972 | Bedford.......................... | 182/106 X |
| D181,617 | 12/1957 | Allison............................ | 182/206 X |

*Primary Examiner*—Stanley H. Tollberg
*Assistant Examiner*—John P. Shannon
*Attorney, Agent, or Firm*—John W. Kraft

[57] ABSTRACT

The demountable stairs comprise stairs, hook assemblies fastened on bars issuing forwardly from the uppermost terminal end of the stairs, each of the hook assemblies comprising a lug fastened to the forwardmost terminal ends of the bars in a socket fastened on the bumper or similar structure roll member of the vehicle into which the lugs are engagable; and a coupling bracket which provides underbracing to the demountable stairs and which is engagable with the hitching ball commonly provided on the vehicle bumper.

4 Claims, 4 Drawing Figures

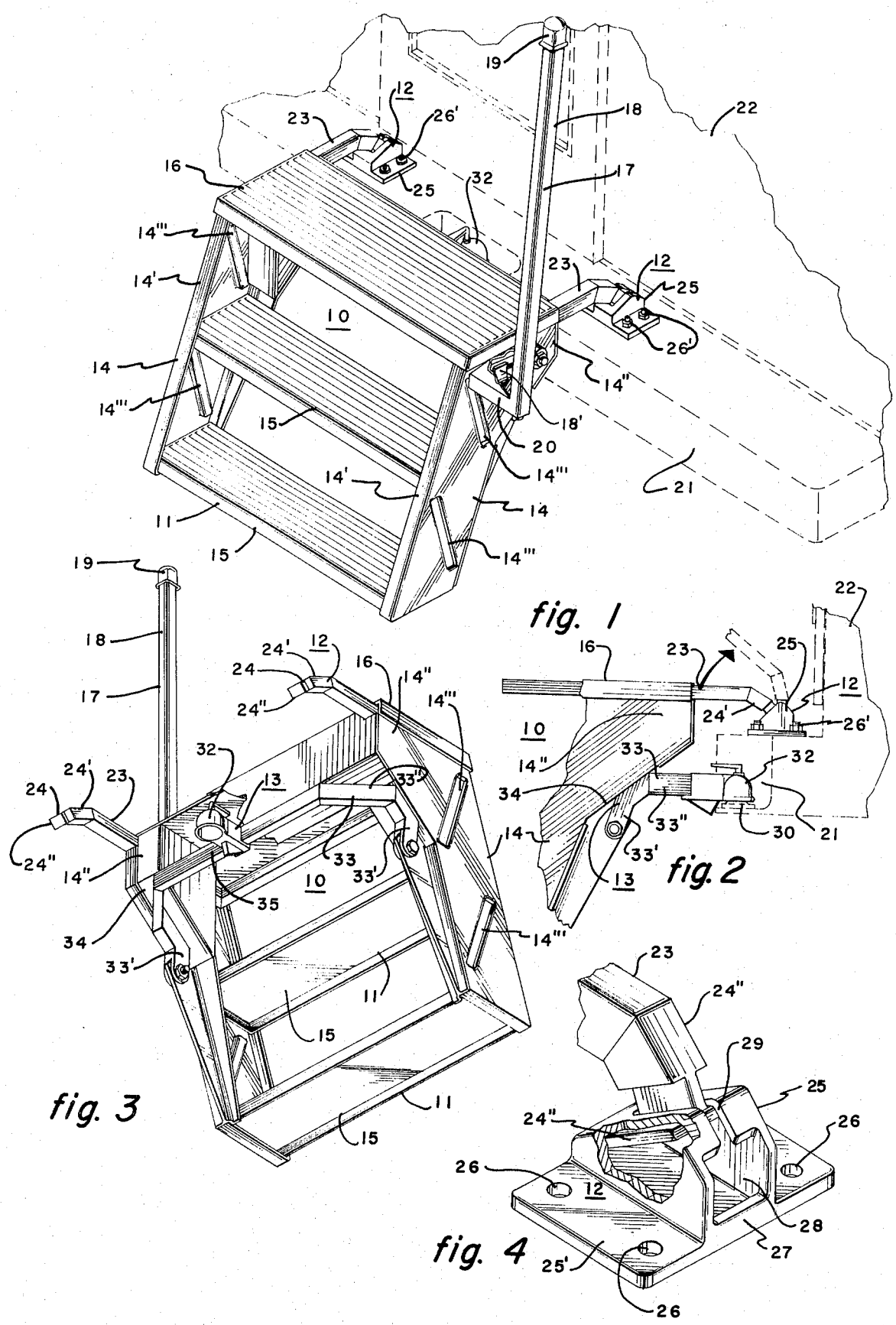
PATENTED JAN 7 1975
3,858,905

3,858,905

DEMOUNTABLE SAFETY LADDER WITH HAND RAIL

FIELD OF INVENTION

The present invention relates to demountable stairs and more particularly to demountable stairs for vehicles and the like which may be conveniently installed and suitably braced.

DESCRIPTION OF THE PRIOR ART

Conventional truck campers are provided with a rear door but is disposed at too great a height above the surface of the ground to permit egress to the camper. This is attributable to the necessity of the camper manouvering during transport, but provides great inconvenience. Auxiliary steps have been provided which may at least compromise the excessive height of the rear door to the ground. Foldable stairs have also been provided but typically such stairs are unstable due to the construction. Demountable stairs which may be engaged and disengaged from the camper vehicle have included some type of unconnected pin or other means for securing the step to the structural member. These pins and the like can become lost and may also be inherently unsafe.

Accordingly, it is an object of the present invention to provide demountable stairs for vehicles which may be demountably secured by means of integrally carried connectors.

It is a further object of this invention that the means of securing the stairs to the member also provides brackets to the stairs to insure load bearing capacity and stability.

These and other objects shall become apparent from the description following, it being understood that modifications may be made without affecting the teachings of the invention here set out.

SUMMARY OF THE INVENTION

The demountable stairs comprise stairs, hook assemblies fastened on bars issuing forwardly from the uppermost terminal end of the stairs, each of the hook assemblies comprising a lug fastened to the forwardmost terminal ends of the bars in a socket fastened on the bumper or similar structure roll member of the vehicle into which the lugs are engagable; and a coupling bracket which provides underbracing to the demountable stairs and which is engagable with the hitching ball commonly provided on the vehicle bumper.

A more thorough and comprehensive understanding may be had from the detailed description of the preferred embodiment when read in connection with the drawings forming a part of this specification.

BRIEF DESCRIPTION OF THE DRAWINGS

FIG. 1 is a right rear perspective view of the demountable safety ladder with hand rail of this invention mounted to a vehicle bumper shown in broken line for illustrative purposes.

FIG. 2 is a fragmentary right side elevational view of the coupling and a hook assembly of this invention shown mounted to a vehicle bumper shown in broken line for illustrative purposes.

FIG. 3 is a bottom perspective view as seen from the left front side of the demountable safety ladder.

FIG. 4 is a perspective view of a typical hook assembly with a portion of its side wall broken away for illustrative purposes.

DETAILED DESCRIPTION OF THE PREFERRED EMBODIMENT

Referring now to the drawings and more particularly to the FIGS. 1 and 3, the demountable safety ladder of this invention is shown to advantage and generally identified by the numeral 10. The demountable ladder 10 comprises stairs 11, a pair of hook assemblies 12, and a coupling bracket 13. The stairs 11 include a pair of stringers 14, a plurality of treads 15 fastened horizontally between the stringers 14, and a landing or platform 16 at the uppermost terminal end of the stringers 14. The stringers 14 include forwardly inclined portion 14' and a bracket portion 14'' which has a forwardmost terminal edge which is perpendicular to the upper side having the platform 16. As a matter of design stringers 14 may have a plurality of cut outs 14''' with stiffening flanges formed about the periferial, to reduce weight of the stairs 10. The treads 15 and the platform 16 may be provided with a skid resistent finish or coating.

One of the stringers 14 (here the right stringer) is provided with a handrail 17. Handrail 17 comprises an upstanding baluster 18 attached at its lowermost terminal end to the stringer 14, and a knob 19 at the uppermost terminal end of baluster 18. The baluster 18 may be spaced a convenient distance distally from the stringer 14 by a spacer 20, and detachably mounted by any of a number of means such as bolts (not shown). The baluster may be pivotally mounted and the stringer 14 may have a clip 18' to detachably secure the baluster 18 when the handrail 17 is in a substantially verticle position.

The hook assemblies 12 are operable to hang the stairs 11 from the bumper 21 or similar structural member of a vehicle 22. A pair of bars 23 issue parallelly forward and substantially horizontally from the bracket portions 14'' at the platform 16. The hook assemblies 12 are fastened at the forwardmost terminal end of the bars 23. Referring to the FIG. 4, each hook assembly 12 comprises a lug 24 and a socket 25. Each lug 24 includes a dominately inclined portion 24' at the forward portion of the bars 23, and a transversely, upwardly inclined plate 24''. Each socket 25 includes a mounting plate 25', and raised hollow enclosure 25'' molded centrally to the uppermost terminal side of the mounting plate 25'. The mounting plate 25' provides the main support for the socket 25 and the body for holes 26 fastening means such as bolts 26'. The forwardly disposed wall 27 of the enclosure 25'' is provided with an entranceway 28 through which the plate 24'' may pass. The upper surfaces of the enclosure 25'' is provided with a rectilinearly disposed slot 29 being cut forwardly from the rearward side of entranceway 28 and being nominally wider than the thickness of the portion 24' of the bars 23. It may be seen that the lug 24 may be engaged with the socket 25 by disposing the plate 24'' through the entranceway 28 and sliding the lug 24 forwardly until the plate 24'' is in contact with the lowermost terminal side of the upper surfaces of the enclosure 25''. Although a plate-like lug 24 and socket enclosure 25'' other shapes may be employed such a spheroid lug 24 and socket 25.

Referring to the FIGS. 2 and 3, the coupling bracket 25 is operable to brace the lowermost terminal side of the stairs 11 against the hitching ball 30 commonly provided at the center of the bumper 21. The coupling 13 comprises a pivotally mounted knee frame 31 and a hitching ball coupling 32. The knee frame 31 comprises a rectilinearly disposed substantially L-shaped brace members 33, each having a substantially vertical member 33' and a horizontal member 33'' issuing forwardly. The lowermost terminal end of the vertical member 33' is pivotally fastened of a point distally from the lowermost terminal end of each bracket portion 14''. The intersect of the members 33' and 33'' is provided with a stringer contacting face 34 which is operable to mate with the lowermost terminal side of the bracket portion 14''. The forwardmost terminal ends of the braces 33 are connected by a transversely disposed bar 35. The coupling 32 is suitably fastened centrally to the bar 35, and is engagable with the hitching ball 30.

The demountable ladder 10 may be installed on the bumper 21 by slideably engaging the lug 24 with the socket 25 of the hook assemblies 12 as set out above and pivoting the forwardmost terminal end of the stairs 11 downwardly to engage the coupling 32 onto the ball 28. It may be seen that the hook assemblies 12 provide support from tension loads on the bumper 21 while the coupling bracket 13 provides compressive force from loads on the stairs 11.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I claim:

1. A demountable safety ladder comprising:

stairs, including a pair of tall exposed stringers, treads fastened horizontally and transversely between said stringers, and a platform at the uppermost terminal end of said stringers;

hook assemblies fastened to the forwardmost terminal ends of bars issuing forwardly, with respect to said vehicle, from the uppermost terminal end of said stringers at said platform, each of said hook assemblies comprising lugs fastened at the forwardmost terminal ends of said bars, and sockets fastened to a suitable structural member of a vehicle said socket having a mounting plate and a raised hollow enclosure moulded centrally to the uppermost terminal side of said mounting plat, the forwardmost terminal side of said enclosure having an entranceway through which said lug may pass, and a rectilinear slot in the upper walls of said enclosure cut from the rearwardmost side of said entranceway through which said bars carrying said lug may pass; and a coupling bracket including a pivotally mounted knee-frame having a pair of rectilinearly disposed L-shaped brace members, each having a substantial vertical member and a horizontal member issuing forwardly at the uppermost terminal end of said vertical member each of said brace members pivotally fastened distally below the uppermost terminal end of said stringer and each of said brace members having a contracting face which may make lowermost terminal side of said stringer, the forwardmost terminal ends of said brace members being connected by a transversely disposed bar, and a hitching ball fastened centrally in said transverse bar of said knee-frame to be engageable with a hitching ball provided on said structural member.

2. The apparatus of claim 1 wherein each of said hook assemblies includes a lug having a transversely disposed plate and wherein said socket member includes an enclosure having a flat wall to be substantially mateable with said plate portion of said lug.

3. The apparatus of claim 1 including a handrail comprising an upstanding baluster fastened at the forwardmost terminal end to a point distally from the uppermost terminal end of the stringer.

4. The apparatus of claim 3 wherein said baluster is pivotally fastened to said stringer and said stringer is provided with a frictional clip to detachably secure said baluster when said handrail is in a substantially vertical position.

* * * * *